United States Patent
Ojo et al.

(10) Patent No.: US 6,409,800 B1
(45) Date of Patent: Jun. 25, 2002

(54) TEMPERATURE SWING ADSORPTION PROCESS

(75) Inventors: Adeola F. Ojo, Scotch Plains; Frank R. Fitch, Bedminster; Martin Bülow, Basking Ridge, all of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 40 days.

(21) Appl. No.: 09/648,982

(22) Filed: Aug. 28, 2000

(51) Int. Cl.$^7$ ............................................. B01D 53/04
(52) U.S. Cl. .............................. 95/96; 95/114; 95/119; 95/120; 95/129; 95/139; 95/143; 95/144; 95/902; 96/130; 96/132; 96/144; 96/154
(58) Field of Search ......................... 95/117–123, 126, 95/129, 139, 143, 144, 902, 96–106; 96/108, 130, 132, 143, 144, 154

(56) References Cited

U.S. PATENT DOCUMENTS

| | | |
|---|---|---|
| 2,882,243 A | 4/1959 | Milton |
| 2,882,244 A | 4/1959 | Milton |
| 2,996,358 A | 8/1961 | Milton |
| 3,012,853 A | 12/1961 | Milton |
| 3,503,901 A | 3/1970 | Pickert |
| 3,576,901 A | 4/1971 | Koktailo et al. |
| 3,723,308 A | 3/1973 | Breck |
| 3,732,326 A | 5/1973 | Chen |
| 3,773,690 A | 11/1973 | Heinze et al. |
| 3,885,927 A | 5/1975 | Sherman et al. |
| 3,985,859 A | 10/1976 | Blaine |
| 4,122,007 A | 10/1978 | Yamamoto et al. |
| 4,173,622 A | 11/1979 | Robertson |
| 4,303,629 A | 12/1981 | Strack et al. |
| 4,443,422 A | 4/1984 | Kostinko |
| 4,556,550 A | 12/1985 | Ross et al. |
| 4,603,040 A | 7/1986 | Kuznicki et al. |
| 4,606,899 A | 8/1986 | Butter et al. |
| 4,775,396 A | 10/1988 | Rastelli et al. |
| 4,913,850 A | 4/1990 | Puppe et al. |
| 5,075,084 A | 12/1991 | Wilhelm et al. |
| 5,152,813 A | 10/1992 | Coe et al. |
| 5,173,462 A | 12/1992 | Plee |
| 5,174,979 A | 12/1992 | Chao et al. |
| 5,203,887 A * | 4/1993 | Toussaint .................. 95/902 X |
| 5,354,360 A | 10/1994 | Coe et al. |
| 5,413,625 A | 5/1995 | Chao et al. |
| 5,451,248 A * | 9/1995 | Sadkowski et al. ....... 95/144 X |
| 5,464,467 A | 11/1995 | Fitch et al. |
| 5,531,808 A | 7/1996 | Ojo et al. |
| 5,560,763 A * | 10/1996 | Kumar ..................... 95/139 X |
| 5,562,756 A | 10/1996 | Coe et al. |
| 5,567,407 A | 10/1996 | Coe et al. |
| 5,656,064 A | 8/1997 | Golden et al. |
| 5,769,928 A * | 6/1998 | Leavitt ..................... 95/143 X |
| 5,779,766 A | 7/1998 | Weigel et al. |
| 5,779,767 A | 7/1998 | Golden et al. |
| 5,882,625 A | 3/1999 | Mac Dougall et al. |
| 5,906,675 A * | 5/1999 | Jain et al. ................. 95/143 X |
| 5,908,823 A | 6/1999 | Zatta et al. |
| 5,914,455 A * | 6/1999 | Jain et al. ................. 95/143 X |
| 5,916,836 A | 6/1999 | Toufar et al. |
| 5,962,358 A | 10/1999 | Hees et al. |
| 6,024,781 A * | 2/2000 | Bulow et al. ............. 95/139 X |
| 6,027,548 A * | 2/2000 | Ackley et al. ............ 95/143 X |
| 6,051,051 A | 4/2000 | Hees et al. |
| 6,074,459 A * | 6/2000 | Gingrich et al. .......... 95/143 X |
| 6,099,619 A * | 8/2000 | Lansbarkis et al. ....... 95/143 X |
| 6,106,593 A | 8/2000 | Golden et al. |
| 6,113,671 A * | 9/2000 | Garrett ..................... 95/144 X |
| 6,143,057 A | 11/2000 | Bülow et al. |
| 6,238,460 B1 * | 5/2001 | Deng et al. ............... 95/139 X |
| 6,270,557 B1 * | 8/2001 | Millet et al. .............. 95/139 X |
| 6,273,939 B1 * | 8/2001 | Millet et al. .............. 95/139 X |
| 6,309,445 B1 * | 10/2001 | Gittleman et al. ........ 95/139 X |

FOREIGN PATENT DOCUMENTS

| | | |
|---|---|---|
| DE | 43 221 | 11/1965 |
| DE | 2 016 838 | 4/1970 |
| EP | 0 196 103 A2 | 3/1989 |
| EP | 0 995 447 A1 | 4/2000 |
| GB | 1 051 621 | 12/1966 |
| GB | 1 580 928 | 12/1980 |
| WO | WO 99/05063 | 2/1999 |

OTHER PUBLICATIONS

M. Tatic and B. Drzaj, Studies in Surface Science and Catalysis, vol. 24 (Zeolites: Synthesis, Structure, Technology and Application), "A Contribution to the Synthesis of the Low–Silica X Zeolite" pp. 129–136, 1985.

Günter H. Kühl, "Crystallization of Low–Silica Faujasite (SiO$_2$/Al$_2$O$_3$~2.0)", Zeolites, 1987, vol. 7, Sep., pp. 451–457.

C. G. Coe, "Molecularly Engineered Adsorbents for Air Separation," Process Technology Proceedings, vol. 8, 1990, pp. 149–157.

D. W. Breck, W. G. Eversole, R. M. Milton, T. B. Reed and T. L. Thomas, "Crystalline Zeolites. I. The Properties of a New Synthetic Zeolite, Type A," Journal of the American Chemical Society, vol. 78, Dec. 8, 1956, No. 23, pp. 5963–5977.

* cited by examiner

Primary Examiner—Robert H. Spitzer
(74) Attorney, Agent, or Firm—Philip H. Von Neida; Salvatore P. Pace

(57) ABSTRACT

Nitrogen oxides and low molecular weight hydrocarbons are removed from air by subjecting the air to a temperature swing adsorption process using as the adsorbent a composite zeolite product containing both zeolite A and zeolite X. The composite zeolite product is preferably prepared by forming a mixture of an agglomerate of silica and sodium zeolite X having a Si/Al atomic ratio in the range of about 0.9 to less than about 1.2 and a water-soluble sodium aluminate salt; maintaining the mixture at a temperature in the range of about 25 to about 100° C. for a period of time sufficient to convert at least 50% of the silica to sodium zeolite A; and at least partially exchanging the zeolite A-containing product with divalent cations, preferably calcium ions.

52 Claims, No Drawings

TEMPERATURE SWING ADSORPTION PROCESS

FIELD OF THE INVENTION

This invention relates to the purification of gases, and more particularly to the decrease of impurity levels of nitrogen oxides and low molecular weight hydrocarbons in air. Specifically, the invention relates to the simultaneous removal of nitrous oxide and $C_2$–$C_5$ hydrocarbon gases from air by contacting the air with a binderless zeolitic composite containing both type A crystalline units and type X crystalline units.

BACKGROUND OF THE INVENTION

In cryogenic air separation units (ASUs), atmospheric air is liquefied at cryogenic temperatures and subsequently fractionally distilled into its major components, nitrogen, oxygen and argon. Since water vapor and carbon dioxide freeze at temperatures well above the temperature at which air is liquefied, these compounds must be removed from atmospheric air prior to its introduction to the ASUs to avoid clogging of ASU equipment lines by the accumulation of ice and frozen carbon dioxide in the heat exchange equipment used to chill the air to its liquefaction temperature. ASUs are commonly equipped with air prepurification units (PPUs) to remove water vapor and carbon dioxide from ASU feed air. In modern ASU plants, the PPUs contain one or more layers of adsorbent materials which selectively adsorb water vapor and/or carbon dioxide from air. Such PPUs are generally operated on either pressure swing adsorption (PSA) cycles or thermal swing adsorption (TSA) cycles. Adsorbents suitable for the removal of moisture from air include activated alumina, silica gel and sodium X zeolite, and those typically used for the removal of carbon dioxide from air include type X zeolites.

Atmospheric air also contains trace amounts of nitrogen oxides and low molecular weight hydrocarbons. Since the concentration of these impurities in atmospheric air is much lower than the concentrations of water vapor and carbon dioxide in the air, their presence in air was not considered to be a problem in cryogenic air separation operations. In recent years, however, the concentration of nitrogen oxides and gaseous hydrocarbons in atmospheric air has been steadily growing as the number and size of operating petroleum refineries and chemical process plants in the world increases. Furthermore, the increase in concentration of some of these impurities in air is accelerating because of their extremely long life in the atmosphere. The "lifetime" of nitrous oxide ($N_2O$), for example, in the atmosphere is as long as 150 years. Because of the increasing demand for higher purity air separation products, and to avoid the creation of explosion or fire hazards in ASUs, it is now often considered highly desirable or necessary to also remove nitrogen oxide and hydrocarbon impurities from the feed air to ASUs.

Unfortunately, the above-mentioned adsorbents have little or no selectivity for nitrogen oxides and hydrocarbons, particularly in the presence of moisture and carbon dioxide. Consequently, they do not effectively remove these impurities from air. Furthermore, although some adsorbents selectively remove certain low molecular weight hydrocarbons from air, while other adsorbents preferentially adsorb nitrogen oxides and certain other low molecular weight hydrocarbons from air, no single adsorbent material is known to effectively remove both nitrogen oxides and all common low molecular weight hydrocarbons from air. For example, type A zeolites, such as cation-exchanged zeolite A and particularly calcium zeolite A, selectively remove some hydrocarbons from air, but they do not preferentially adsorb nitrogen oxides, while, on the other hand, divalent cation-exchanged type X zeolites, such as calcium X zeolite, readily adsorb nitrogen oxides from air, but do not remove all hydrocarbons from air.

It can be appreciated from the above, that if it is desired to have an air purification system remove substantially all low molecular weight hydrocarbons and nitrogen oxides from atmospheric air using currently practiced adsorption technology, it will be necessary to include multiple adsorbent layers in the purification system. If it is also desired to remove water vapor and carbon dioxide from the air, it may be necessary to additionally include in the system a layer of adsorbent to remove water vapor, and one to remove carbon dioxide.

Crystallization techniques for making various type X and type A zeolites are described in the patent and technical literature. Typical of such procedures are those described in U.S. Pat. Nos. 2,882,243, 2,882,244, 4,173,622, 4,303,629, 4,443,422, East German Patent 43,221 and British Pat. No. 1,580,928, and in Tatic, M. et al., in "Zeolites: Synthesis, Structure, Technology and Application", *Studies in Surface Science and Catalysis*, vol. 24, pp. 129–136 (1985).

Procedures for producing alkali or alkaline earth ion-exchanged zeolite A-zeolite X composites are disclosed in U.S. Pat Nos. 4,913,850, 5,075,084 5,908,823 and 5,962, 358. U.S. Pat. No. 5,908,823 discloses directly synthesizing a composite zeolitic composition containing both zeolite A and zeolite X , and U.S. Pat. Nos. 4,913,850, 5,075,084 and 5,962,358 disclose agglomerating zeolite X or a mixed zeolite X-zeolite-type A composition with an $SiO_2$ binder and converting the binder to zeolite type A by contact with sodium aluminate.

Efforts to develop more efficient and less costly methods and equipment for removing all of the above-described impurities from atmospheric air prior to its introduction into an ASU are constantly sought. The present invention provides a method and PPU system which accomplish this goal.

SUMMARY OF THE INVENTION

According to a first broad embodiment, the invention comprises apparatus comprising:

(a) a vessel having a feed air inlet and a purified air outlet;

(b) a water vapor-selective adsorbent positioned within the vessel adjacent the air inlet; and (c) a composite zeolitic adsorbent selective for at least one nitrogen oxide and at least one low molecular weight hydrocarbon positioned within the vessel between the water vapor-selective adsorbent and the purified air outlet, the composite zeolitic adsorbent comprising about 5 to about 95% by weight zeolite A and about 95 to about 5% by weight zeolite X, and wherein at least part of the exchangeable cations of the zeolite A and at least part of the exchangeable cations of the zeolite X are divalent cations.

In a preferred aspect of the apparatus embodiment of the invention, the composite zeolitic adsorbent is made by a process which includes the step of contacting an agglomerate of at least one of zeolite A or zeolite X and an inert binder comprising silica, clay, alumina or combinations thereof with a reagent which effects the conversion of at least part of the inert binder to the other of zeolite A or zeolite X.

In another preferred aspect of the apparatus embodiment, the composite zeolitic adsorbent is made by a process which includes the step of contacting an agglomerate comprising zeolite X and an inert binder comprising silica, clay, alumina or combinations thereof with a reagent which effects the conversion of at least part of the inert binder to zeolite A. In a more preferred aspect, at least 95% of the inert binder is converted to zeolite A.

In another preferred aspect of the apparatus embodiment, the inert binder comprises silica and the reagent comprises sodium aluminate, sodium hydroxide, potassium hydroxide or mixtures thereof. In another preferred aspect, the inert binder is silica-alumina.

In another preferred aspect of the apparatus embodiment, the inert binder comprises clay and the reagent comprises sodium hydroxide, potassium hydroxide or mixtures thereof. In a more preferred aspect, the clay comprises kaolin, metakaolin, kaolinite, nacrite, dickite, halloysite or combinations thereof. Most preferably, the clay comprises kaolin.

In another preferred aspect of the apparatus embodiment, the inert binder comprises alumina and the reagent comprises sodium silicate and sodium hydroxide, potassium hydroxide or mixtures thereof.

In another preferred aspect of the apparatus embodiment, about 50 to about 100% of the exchangeable cations of the zeolite A and about 50 to about 100% of the exchangeable cations of the zeolite X comprise calcium, magnesium, strontium, barium, zinc, copper, cadmium, cobalt, manganese, iron, nickel or mixtures thereof. In a more preferred aspect, if the exchangeable cations comprise calcium ions.

In another preferred aspect of the apparatus embodiment, at least about 50% of the zeolite X has a Si/Al atomic ratio in the range of about 0.9 to less than about 1.15.

In another preferred aspect of the apparatus embodiment, the composite zeolitic adsorbent comprises about 20 to about 50% by weight zeolite A and about 80 to about 50% by weight zeolite X.

In another preferred aspect, the apparatus further comprises a carbon dioxide-selective adsorbent positioned within the vessel between the water vapor-selective adsorbent and the composite zeolitic adsorbent. In a more preferred aspect, the water vapor-selective adsorbent comprises activated alumina, silica gel, zeolite sodium X or mixtures thereof, and the carbon dioxide-selective adsorbent comprises zeolite X.

In a preferred apparatus embodiment, the composite zeolitic adsorbent is prepared by the process comprising the steps:
  (a) forming a mixture comprising (1) an agglomerate comprising silica and zeolite X comprising sodium ions or both sodium and potassium ions, the zeolite X having a Si/Al atomic ratio in the range of about 0.9 to less than about 1.25, and (2) an aqueous alkaline aluminate solution comprising sodium hydroxide, potassium hydroxide, or mixtures thereof;
  (b) maintaining the mixture at a temperature in the range of about 25 to about 100° C. for a period of time sufficient to convert at least 50% of the silica to zeolite A; and
  (c) at least partially exchanging the product of step (b) with divalent cations.

In one aspect of this preferred embodiment, the agglomerate additionally comprises zeolite A.

In another aspect of this preferred embodiment, upon completion of step (b), at least about 95% of the silica has been converted to zeolite A.

In another aspect of this preferred embodiment, the divalent cations comprise calcium ions.

In another aspect of this preferred embodiment, the zeolite X has a Si/Al atomic ratio less than about 1.1.

In another aspect of this preferred embodiment, the process comprises maintaining the mixture at a temperature in the range of about 70 to about 90° C. during at least part of step (b).

In another aspect of this preferred embodiment, upon completion of step (c), at least about 95% of the exchangeable cations of the zeolite A and at least about 95% of the exchangeable cations of the zeolite X of the composite zeolitic adsorbent are calcium ions.

According to another broad embodiment, the invention comprises a method of purifying a gas comprising the step of removing at least one nitrogen oxide and at least one low molecular weight hydrocarbon from the gas by subjecting the gas to a cyclical adsorption procedure comprising an adsorption step and an adsorbent regeneration step using a composite zeolitic adsorbent which comprises about 5 to about 95% by weight zeolite A and about 95 to about 5% by weight zeolite X, and wherein at least part of the exchangeable cations of the zeolite A and at least part of the exchangeable cations of the zeolite X are divalent cations.

In a preferred aspect of the method embodiment, the composite zeolitic adsorbent is made by a process which includes the step of contacting an agglomerate of at least one of zeolite A or zeolite X and an inert binder comprising silica, clay, alumina or combinations thereof with a reagent which effects the conversion of at least part of the inert binder to the other of zeolite A or zeolite X.

In another preferred aspect of the method embodiment, the composite zeolitic adsorbent is made by a process which includes the step of contacting an agglomerate comprising zeolite X and an inert binder comprising silica, clay, alumina or combinations thereof with a reagent which effects the conversion of at least part of the inert binder to zeolite A. In a more preferred aspect at least 95% of the inert binder is converted to zeolite A.

In another preferred aspect of the method embodiment, the inert binder comprises silica and the reagent comprises sodium aluminate, sodium hydroxide, potassium hydroxide or mixtures thereof.

In another preferred aspect of the method embodiment, the agglomerate comprises silica and zeolite sodium X.

In another preferred aspect of the method embodiment, the inert binder is silica-alumina.

In another preferred aspect of the method embodiment, the inert binder comprises clay and the reagent comprises sodium hydroxide, potassium hydroxide or mixtures thereof. In a more preferred aspect of this embodiment, the clay comprises kaolin, metakaolin kaolinite, nacrite, dickite, halloysite or combinations thereof. Most preferably, the clay comprises kaolin.

In another preferred aspect of the method embodiment, the inert binder comprises alumina and the reagent comprises silica and sodium hydroxide, potassium hydroxide or mixtures thereof.

In another preferred aspect of the method embodiment, about 50 to about 100% of the exchangeable cations of the zeolite A and about 50 to about 100% of the exchangeable cations of the zeolite X comprise calcium, magnesium, strontium, barium, zinc, copper, cadmium, cobalt, manganese, iron, nickel or mixtures thereof. In a more preferred aspect, the exchangeable cations comprise calcium ions.

In another preferred aspect of the method embodiment, at least about 50% of the zeolite X has a Si/Al atomic ratio in the range of about 0.9 to less than about 1.15.

In another preferred aspect of the method embodiment, the composite zeolitic adsorbent comprises about 20 to about 50% by weight zeolite A and about 80 to about 50% by weight zeolite X.

In a preferred gas purification embodiment, the composite zeolitic adsorbent is prepared by the process comprising the steps:

(a) forming a mixture comprising (1) an agglomerate comprising silica and zeolite X comprising sodium ions or both sodium and potassium ions, the zeolite X having a Si/Al atomic ratio in the range of about 0.9 to less than about 1.25, and (2) an aqueous alkaline aluminate solution comprising sodium hydroxide, potassium hydroxide, or mixtures thereof;

(b) maintaining the mixture at a temperature in the range of about 25 to about 100° C. for a period of time sufficient to convert at least 50% of the silica to zeolite A; and (c) at least partially exchanging the product of step (b) with divalent cations.

In an aspect of this preferred embodiment, the agglomerate additionally comprises zeolite A.

In another aspect of this preferred embodiment, upon completion of step (b), at least about 95% of the silica has been converted to zeolite A.

In another aspect of this preferred embodiment, the process comprises maintaining the mixture at a temperature in the range of about 70 to about 90° C. during at least part of step (b).

In another aspect of this preferred embodiment, the divalent cations comprise calcium ions.

In another aspect of this preferred embodiment, upon completion of step (c), at least about 95% of the exchangeable cations of the zeolite A and at least about 95% of the exchangeable cations of the zeolite X of the composite zeolitic adsorbent are calcium ions.

In another aspect of this preferred embodiment, the gas being purified is air.

In another aspect of this preferred embodiment, the zeolite X has a Si/Al atomic ratio less than about 1.1.

In another aspect of this preferred embodiment, the cyclical adsorption procedure is temperature swing adsorption. In a preferred variation of this aspect, the adsorbent regeneration step is carried out at a temperature in the range of about 150 to about 280° C.

In another aspect, this preferred embodiment further comprises, prior to removing the at least one nitrogen oxide and the at least one low molecular weight hydrocarbon from the gas being purified, removing water vapor from the gas by passing the gas through a water vapor-selective adsorbent comprising activated alumina, silica gel, zeolite sodium X or mixtures thereof.

In another aspect, this preferred embodiment further comprises, prior to removing the at least one nitrogen oxide and the at least one low molecular weight hydrocarbon from the gas being purified but subsequently to removing water vapor from the gas, removing carbon dioxide from the gas by contacting the gas with an adsorbent comprising zeolite X.

In another aspect of this preferred embodiment, the at least one low molecular weight hydrocarbon comprises $CH_4$, $C_2$ hydrocarbons, $C_3$ hydrocarbons, $C_4$ hydrocarbons, $C_5$ hydrocarbons, or mixtures thereof. In another aspect of this preferred embodiment, the at least one nitrogen oxide comprises nitrous oxide.

DETAILED DESCRIPTION OF THE INVENTION

The nitrogen oxide- and low molecular weight hydrocarbon-selective adsorbents used in the invention are composites containing both at least partially divalent cation-exchanged zeolite type A crystal units and at least partly divalent cation-exchanged zeolite type X crystal units. The at least partially divalent-cation-exchanged type A zeolite crystals are effective for the adsorption of linear low molecular weight hydrocarbons, such as ethane, ethylene, propane, n-butane, etc. The at least partially divalent cation-exchanged type X zeolites, particularly calcium-exchanged type X zeolite, are highly effective for the adsorption of nitrogen oxides, particularly nitrous oxide, from gas streams. Divalent cation-exchanged type X zeolites also preferentially adsorb larger sized low molecular weight hydrocarbons, such as straight-chain, branched-chain and aromatic hydrocarbons, from gas streams. For purposes of this invention, low molecular weight hydrocarbons are defined as those having up to eight carbon atoms.

Suitable composite zeolitic adsorbents can be made by any method. One method comprises agglomerating a blend of type A and type X zeolite. This procedure is described in detail in U.S. Pat. application Ser. No. 09/661,815, filed of even date hereof by the assignee of this invention, as Docket No. M00A204. Another method comprises crystallizing a sodium ion-containing or sodium ion- and potassium ion-containing silicate-aluminate hydrogel under conditions which results in the formation of a zeolitic composite which, as synthesized, contains intergrown type A and type X zeolite, and then agglomerating the intergrown zeolite with a suitable inert binder. This procedure is described in detail in U.S. Pat. application Ser. No. 09/648,802, filed of even date hereof as Docket No. 00A287, that application and this application having a common assignee.

A more preferred method of preparing the composite zeolitic adsorbents comprises contacting a composition of at least one of zeolite A or zeolite X and an inert binder comprising silica, clay or alumina, or combinations of these, with a chemical reagent which reacts with the inert binder to form at least the other of zeolite A or zeolite X. In other words, if the initial composition contains only zeolite X, the reaction will be conducted under conditions such that at least part of the inert binder will be converted to zeolite A, and if the initial composition contains only zeolite A, the reaction will be conducted under conditions such that at least part of the inert binder will be converted to zeolite X. It is not necessary that the initial material contain only one type of zeolite, and in fact it often happens that the starting zeolite material will contain both zeolite A and zeolite X. Furthermore, it is not necessary that the inert binder be converted to only one of zeolite A or zeolite X; it can be converted to a mixture of zeolite A and zeolite X. A principal advantage of this preferred method of preparing the composite zeolitic adsorbent is that the composite can be made to be substantially free of inert binder, in which case substantially all of the composite material will have gas adsorption properties.

The relative proportions of zeolite X and zeolite A in the composite zeolite adsorbent used in the gas adsorption applications of the invention may vary over a wide range, and the desired zeolite X/zeolite A ratio will depend, inter alia, upon the particular application in which the composite will be used. If the zeolite is to be used to purify gases containing high concentrations of hydrocarbons relative to the concentration of nitrogen oxides in the gases, it may be desirable to use composites comprising as much as 50% or more zeolite A. On the other hand, if the concentration of hydrocarbons in the gas is low relative to the concentration of nitrogen oxides in the gas, it may be preferable to use a composite comprised predominantly of zeolite X. In general, the composite may contain 5 to 95% zeolite X and 95 to 5% zeolite A, based on the total weight of zeolite X and zeolite A in the composite. In preferred embodiments the composite contains about 80 to 50% by weight zeolite X and about 20 to 50% by weight zeolite A.

Since, for most adsorption applications the preferred composite zeolitic adsorbent contains zeolite X as the major component and zeolite A as the minor component, it is preferred to use as the starting material an agglomerate comprising zeolite X as the major component. The zeolite X may be conventional to high silicon type X zeolite, defined as type X zeolite having a Si/Al atomic ratio in the range of 1.2 to about 1.5, medium silicon type X zeolite (MSX), defined as type X zeolite having a Si/Al atomic ratio in the range of 1.1 to about less than about 1.2, or low silicon type X zeolite (LSX), defined as type X zeolite having a Si/Al atomic ratio of 0.9 to about less than about 1.1, Although the theoretical minimum Si/Al atomic ratio in zeolite X is 1.0, apparent Si/Al atomic ratios of type X zeolites as low as 0.9 have been measured, due to defects in the structure of the zeolite, the presence of impurities, such as occluded alumina and/or aluminates and/or errors in measurement. For purposes of this description, it is assumed that the minimum silicon to aluminum ratio of type X zeolite is 0.9, In preferred embodiments of the invention, the agglomerate contains zeolite X having a Si/Al atomic ratio in the range of about 0.9 to less than about 1.2, i. e., a combination of MSX and LSX, and in more preferred embodiments it contains substantially only LSX, and it can be composed substantially of zeolite sodium LSX (NaLSX) or zeolite sodium-potassium LSX (Na,KLSX). As noted above, the agglomerate may additionally contain zeolite A as a minor component.

For economic reasons, zeolite X is generally synthesized from a hydrogel containing only sodium ions as neutralizing cations, so that the crystallized product will have only sodium ions as exchangeable cations. However, some manufacturing procedures call for the use of a mixture of sodium hydroxide and potassium hydroxide in the crystallization process, in which case the crystallized product will have both sodium ions and potassium ions as exchangeable cations. This is often the case when producing LSX. It has been found that when LSX is produced from hydrogels containing only sodium ions, the resulting product will have a considerable amount of zeolite A impurity. On the other hand, when the hydrogel contains both sodium and potassium ions, it is easier to prevent the formation of zeolite A. In any event, if the exchangeable cations comprise a combination of sodium ions and potassium ions, it may be desirable to convert the potassium ions to sodium ions in preparation for the divalent cation exchange (described below). This can be accomplished by, for example, contacting the zeolite composite with an aqueous solution of sodium hydroxide at an elevated temperature.

As used herein, the term "inert binder" means any binder material composed of silica, clay, alumina or combinations of these suitable for use in the agglomeration of zeolitic material and which possesses very little or no gas adsorption capability. The inert binder may be amorphous, partly crystalline or crystalline. Suitable sources of silica include waterglasses, silica sols, aerosils (fumed silicas) silica gels and precipitated silicas; Sources of alumina useful in preparing the zeolitic composites include hydrated aluminum hydroxide, pseudo-boehmite, alumina trihydrate, etc.; and suitable clays include kaolins, such as raw kaolin, calcined kaolin, metakaolin, etc., and kandites, such as kaolinite, nacrite, dickite, halloysite, etc. Inert binders comprising combinations of silica and alumina, for example, binary compositions such as silica-alumina, can also be used in the invention.

The reaction that converts the inert binder to zeolite is tailored to produce a zeolitic composite having the desired ratio of zeolite X to zeolite A. in the preferred embodiment, this is accomplished by using as the starting material an agglomerate that contains substantially pure zeolite X, and converting substantially all of the inert binder to zeolite A. In this case the inert binder is present in the agglomerate at a concentration that will result in the preparation of a composite product having the desired ratio of zeolite X to zeolite A. If the agglomerate contains an amount of inert binder in excess of the amount which will produce the desired zeolite X/zeolite A ratio, the inert binder conversion reaction can be controlled to produce the desired composite by limiting the amount of inert binder converted to zeolite A. As noted above, the ratio of zeolite X to zeolite A in the product can also be controlled by starting with zeolite X-zeolite A composites and/or by converting the inert binder to zeolite A and zeolite X, or by using a zeolite A-containing agglomerate as the starting material and converting the inert binder to zeolite X or to both zeolite X and zeolite A.

The chemical reagent used in the zeolite-forming reaction will depend upon which inert binder is being used as the starting material. If the inert binder is silica, the reagent will desirably be a water-soluble aluminate, and preferably will be a mixture of sodium aluminate and sodium hydroxide or both sodium hydroxide and potassium hydroxide. The water-soluble aluminate can be prepared by, for example, reacting hydrated aluminum hydroxide with an aqueous solution of sodium hydroxide. If inert binder is a clay, which contains both silica and alumina, the chemical reagent can be an aqueous solution of sodium hydroxide or sodium hydroxide-potassium hydroxide mixture. If the inert binder is alumina, the desired reagent will be a mixture of sodium silicate and sodium hydroxide or sodium hydroxide-potassium hydroxide mixture. The ratio of inert binder to chemical reagent can vary over a wide range, and those familiar with zeolite synthesis can easily determine the optimum ratios for the conversion reaction.

As noted above, the composite zeolite A-zeolite X adsorbents used in the invention are at least partially, and preferably substantially completely exchanged with divalent cations in preparation for use in the gas purification applications of the invention. Although it is usually preferable that the composite be substantially completely exchanged with divalent cations, it is sometimes preferable to only partially exchange the composite, so that zeolite A and zeolite X exchangeable cations will include sodium or both sodium and potassium type A and type X zeolite crystal units in addition to divalent cations. Divalent cations with which the zeolitic composite can be exchanged onto the zeolite composite include calcium, magnesium, strontium, barium, zinc, copper, cadmium, cobalt, manganese, iron, nickel or mixtures thereof. The preferred divalent cations are the Group 2A ions, particularly calcium, magnesium, strontium and barium. The most preferred divalent cation is calcium.

Although clays and aluminas are also of considerable interest for use in making the zeolitic composites, the invention will be described in detail as it applies to the preparation of a composite zeolitic adsorbent from an agglomerated zeolite X in which silica is the inert binder, and wherein the silica is converted to zeolite A.

A preferred procedure for converting the agglomerated zeolite to substantially binderless composite zeolite is described in DE-A20 16 838, and in U.S. Pat. Nos. 4,913,850, 5,075,084 and 5,962,358, the disclosures of all of which are incorporated herein by reference. According to this procedure, zeolite X containing, as exchangeable cations, sodium or sodium and potassium ions, is agglomerated with a silica binder. The agglomerate is then treated with an aqueous solution of sodium aluminate and sodium hydroxide or a mixture of sodium hydroxide and potassium hydroxide for a sufficient period of time to convert some or all of the silica binder to zeolite sodium A or zeolite sodium-potassium A. The converted agglomerate is next subjected to a cation exchange procedure to convert some or all of the exchangeable cations of the composite zeolite to divalent cations. However, as noted above, if some of the exchangeable cations of the composite are potassium ions, it is preferable to convert these to sodium ions prior to divalent cation exchange. The divalent cation-exchanged product is then activated by, for example, heating it to a high temperature.

Considering the preferred method of preparing the composite zeolitic adsorbents in more detail, the desired zeolite X, for example zeolite sodium X, is first mixed with a silica binding agent sufficiently to form a uniform blend. The relative proportions of zeolite X and silica may vary over a wide range, and the actual proportions used will be determined by the amount of zeolite A that is desired in the final product, as described above.

The blended mixture is next aggregated by any suitable method, for example, by extrusion and pelletizing, or by bead formation. The agglomeration process is carried out under conditions that will produce "green" aggregate of the desired particle size. In general, the average dimension of the agglomerated particles will desirably be in the range of about 0.2 to about 15 mm and will preferably be in the range of about 0.5 to about 5 mm. The green aggregate can be directly contacted with aluminate solution to convert silica in the composite to zeolite A, or it can be cured by heating it to a temperature in the range of about 400 to about 700° C. for a sufficient period of time to effect the desired curing, and then treated with aluminate solution.

The conversion of silica in the aggregate to zeolite A is effected by reacting the aggregate with an aqueous alkaline aluminate solution, such as sodium aluminate. The aluminate solution can be prepared by, for example, dissolving alumina hydrate in a sodium hydroxide solution, preferably at elevated temperatures, such as at the boiling temperature, to form a concentrate, and diluting the concentrate with sufficient water to form the desired reaction solution. The reaction between the aggregate particles and the aluminate solution is desirably carried out under conditions that provide continuous intimate contact between the aluminate and the particles. In a preferred procedure, the aqueous sodium aluminate solution is circulated through the granulated aggregate at ambient temperature for several hours, after which the reaction mixture is heated, preferably to a temperature in the range of about 70 to about 90° C. preferably in a stepwise procedure carried out over a period of several hours, until the desired degree of conversion of silica to zeolite A is attained. It is usually desirable to convert at least 90% by weight, and preferably substantially all, of the silica binder to zeolite A, to produce a product that will provide the maximum adsorption efficiency. When the desired degree of conversion of silica to zeolite A is attained, the mixed zeolite is washed with water and dried.

The final step of the zeolite preparation process is divalent cation exchange. The divalent cations can be any of those mentioned above, but calcium is the preferred cation, since calcium ions produce a zeolitic composite which is particularly effective for the separation of nitrogen oxides and hydrocarbons from gases such as air.

Divalent cation-exchange can be carried out by contacting the composite with sources of divalent cations, including bases, such as $Ca(OH)_2$, $Mg(OH)_2$, etc., and salts, such as $CaCl_2$, $MgCl_2$, etc., at temperatures in the range of, for example, about 25 to about 200° C. Preferably, the composite is partially or fully exchanged with calcium ions. The ion-exchange step can be carried out by any of the well-known procedures, for example, by contacting the composite particles with the aqueous base or salt solution of the desired ions, thereby substituting at least part of the sodium or sodium and potassium ions initially on the particles with the selected exchange ions. The divalent cation exchange is generally carried out under conditions that will effect the production of a product in which at least part, and preferably about 50 to about 100% by equivalence, of the exchangeable cations of the zeolite A and at least part, and preferably at least about 50 to about 100% by equivalence, of the exchangeable cations of the zeolite X are divalent cations.

After divalent cation-exchange, the composite is generally washed, dried and activated, preferably by heating it with a dry gas, such as air or nitrogen, at a temperature in the range of about 200 to about 800° C., and preferably at a temperature in the range of about 300 to about 700° C.

The nitrogen-oxide- and low molecular weight hydrocarbon-selective zeolites can be used in various industrial applications, such as adsorptive gas purification or gas separation. An adsorption application to which the products of the invention are well adapted is the prepurification of air by temperature swing adsorption (TSA) or pressure swing adsorption (PSA) prior to introducing the air into an air separation unit, such as a cryogenic distillation column. The zeolites of the invention are particularly suitable for such processes because of their excellent adsorption properties. They are especially suitable for TSA processes because they also possess superior thermal stability.

In air PPU systems, the nitrogen oxide- and hydrocarbon-selective zeolite can be used as a single layer or it can be used as in combination with other adsorbents. In a preferred application, the zeolite is used as a downstream layer, for example, downstream of a water-selective layer, such as activated alumina, silica gel, etc., and a carbon dioxide-selective layer, such as zeolite NaX, etc. Since water vapor is more strongly adsorbed by most common adsorbents, it is desirable to position the water-selective layer at the air feed inlet end of the PPU. Similarly, carbon dioxide is strongly adsorbed by many adsorbents; accordingly, it is preferable to position the carbon dioxide-selective layer upstream of the nitrogen oxide-selective and hydrocarbon-selective zeolite, most preferably between the water selective layer and the nitrogen oxide- and hydrocarbon-selective zeolite layer.

PSA and TSA processes are generally cyclical and comprise at least an adsorption step and an adsorbent regeneration step. In TSA processes, the adsorption step is generally carried out at a temperature in the range of about 5 to about 50° C. and the adsorbent regeneration step is generally carried out at a temperature in the range of about 100 to about 250° C.

It will be appreciated that it is within the scope of the present invention to utilize conventional equipment to monitor and automatically regulate the synthesis and gas separation methods so that they can be fully automated to run continuously in an efficient manner.

The invention is further illustrated by the following examples, in which, unless otherwise indicated, parts, percentages and ratios are on a mole basis.

EXAMPLE 1 (HYPOTHETICAL)

Low silicon X (LSX) is synthesized with a Si/Al atomic ratio of 1.0 according to the procedures described by G. H. Kuhl in UK 1,580,928, The resulting product, LSX zeolite having sodium and potassium ions as exchangeable cations, is then converted to sodium LSX by four static exchanges with 20 ml of 1.0 N NaCl solution per g of zeolite at 80° C. After each exchange, the sample is washed with aqueous NaOH (0.01 N). The resulting sodium LSX powder is granulated and then calcium exchanged following the general procedure described by Heinze et al. for zeolite X in U.S. Pat. No. 3,773,690, Examples 2 and 5. The resulting product, in bead form, is composed of approximately 80 wt. % NaLSX and 20 wt. % $SiO_2$ as inert binder. The $SiO_2$ binder is converted into sodium zeolite A by treating the beads with an aqueous alkaline solution of sodium aluminate. The resulting product, binderless NaLSX—NaA zeolite composite, is calcium exchanged by treatment with calcium chloride solution in a glass column. The analysis of the dried and activated product is expected to show an ion exchange capacity of about 97% and to have a composition of about 60 wt. % CaLSX and 40 wt. % CaA.

EXAMPLE 2 (HYPOTHETICAL)

This example projects the testing of the process of the invention on a typical bench-scale TSA PPU unit, using the binderless composite zeolitic adsorbent of the invention prepared in Example 1, The hydrocarbons listed in the Table are assumed to be in the test air feed stream at the concentrations indicated in the Table. These hydrocarbons are selected based on the results of a series of air quality surveys. The concentrations of the hydrocarbons were based on the maximum observed values in the air quality surveys enhanced by 15%. The lower detection limits of all the above compounds were established by FTIR analysis. The adsorption temperature, feed gas pressure and superficial velocity are assumed to be 15° C., 85.6 psia, and 0.59 ft/sec, respectively. The projected results of this TSA PPU test experiment are also reported in Table 1, In all cases, the $CO_2$ concentration in the TSA PPU product is assumed to be about 0.85 ppm.

TABLE 1

| | | % Removal | | |
| --- | --- | --- | --- | --- |
| Feed Impurity (Conc., ppm) | Detection Limit, ppm | UOP NaX | BOC NaLSX | Example 1 Adsorbent |
| Water (saturated) | 1 | 85 | 100 | 100 |
| $CO_2$ (460) | 0.001 | 85 | 100 | 100 |
| $N_2O$ (0.35–0.41) | 0.005 | 29 | 38 | 100 |
| $C_2H_2$ (0.46–0.55) | 0.007 | 80 | 85 | 100 |
| $C_2H_4$ (1.60–1.85) | 0.01 | 29 | 34 | 100 |
| $C_2H_6$ (1.60) | 0.01 | 8 | 8 | 100 |
| $C_3H_6$ (0.65–0.90) | 0.01 | 85 | 90 | 100 |
| $C_3H_8$ (1.7–1.8) | 0.05 | 34 | 35 | 100 |
| n-$C_4H_{10}$ (1.85–2.10) | 0.02 | 80 | 85 | 100 |

The commercial adsorbent product, UOP NaX zeolite (grade APG II), is not expected to fully remove any of the impurities. The BOC NaLSX adsorbent is projected to fully remove $CO_2$ and $H_2O$, but it is not expected to fully remove the other impurities in the gas stream. The Table also shows that it is projected that the binderless composite zeolite of Example 1 will remove substantially all of the trace impurities in the gas stream, including $N_2O$ and all hydrocarbons present.

Although the invention has been described with particular reference to specific equipment arrangements and to a specific experiment, these features are merely exemplary of the invention and variations are contemplated. The scope of the invention is limited only by the breadth of the appended claims.

What is claimed is:

1. A method of purifying a gas comprising the step of removing at least one nitrogen oxide and at least one low molecular weight hydrocarbon from said gas by subjecting said gas to a cyclical adsorption procedure comprising an adsorption step and an adsorbent regeneration step using a composite zeolitic adsorbent which comprises about 5 to about 95% by weight zeolite A and about 95 to about 5% by weight zeolite X, and wherein at least part of the exchangeable cations of said zeolite A and at least part of the exchangeable cations of said zeolite X are divalent cations.

2. The method of claim 1, wherein said composite zeolitic adsorbent is made by a process which includes the step of contacting an agglomerate comprising at least one of zeolite A or zeolite X and an inert binder comprising silica, clay, alumina or combinations thereof with a reagent which effects the conversion of at least part of said inert binder to the other of zeolite A or zeolite X.

3. The apparatus of claim 2, wherein said composite zeolitic adsorbent is made by a process which includes the step of contacting an agglomerate comprising zeolite X and an inert binder comprising silica, clay, alumina or combinations thereof with a reagent which effects the conversion of at least part of said inert binder to zeolite A.

4. The method of claim 3, wherein at least 95% of the inert binder is converted to zeolite A.

5. The method of claim 3, wherein said inert binder comprises silica and said reagent comprises sodium aluminate, sodium hydroxide, potassium hydroxide or mixtures thereof.

6. The method of claim 5, wherein said agglomerate comprises silica and zeolite sodium X.

7. The method of claim 6, wherein said inert binder is silica-alumina.

8. The method of claim 3 wherein said inert binder comprises clay and said reagent comprises sodium hydroxide, potassium hydroxide or mixtures thereof.

9. The method of claim 8, wherein said clay comprises kaolin, metakaolin, kaolinite, nacrite, dickite, halloysite or combinations thereof.

10. The method of claim 9, wherein said clay comprises kaolin.

11. The method of claim 3, wherein said inert binder comprises alumina and said reagent comprises silica and sodium hydroxide, potassium hydroxide or mixtures thereof.

12. The method of claim 3, wherein about 50 to about 100% of the exchangeable cations of said zeolite A and about 50 to about 100% of the exchangeable cations of said zeolite X comprises calcium, magnesium, strontium, barium, zinc, copper, cadmium, cobalt, manganese, iron, nickel or mixtures thereof.

13. The method of claim 12, wherein said exchangeable cations comprise calcium ions.

14. The method of claim 13, wherein at least about 50% of said zeolite X has a Si/Al atomic ratio in the range of about 0.9 to less than about 1.15.

15. The method of claim 14, wherein said composite zeoliticadsorbent comprises about 20 to about 50% by weight zeolite A and about 80 to about 50% by weight zeolite X.

16. The method of claim 3, wherein said composite zeolitic adsorbent is prepared by the process comprising the steps:

(a) forming a mixture comprising (1) an agglomerate comprising silica and zeolite X comprising sodium ions or both sodium and potassium ions, said zeolite X having a Si/Al atomic ratio in the range o f about 0.9 to less than about 1.25, and (2) an aqueous alkaline aluminate solution comprising sodium hydroxide, potassium hydroxide, or mixtures thereof;

(b) maintaining said mixture at a temperature in the range of about 25 to about 100° C. for a period of time sufficient to convert at least 50% of said silica to zeolite A; and (c) at least partially exchanging the product of step (b) with divalent cations.

17. The method of claim 16, wherein said agglomerate additionally comprises zeolite A.

18. The method of claim 16, wherein upon completion of step (b), at least about 95% of said silica has been converted to zeolite A.

19. The method of claim 16, wherein said process comprises maintaining said mixture at a temperature in the range of about 70 to about 90° C. during at least part of step (b).

20. The method of claim 19, further comprising, prior to removing said at least one nitrogen oxide and said at least one low molecular weight hydrocarbon from said gas, removing water vapor from said gas by passing said gas through a water vapor-selective adsorbent comprising activated alumina, silica gel, zeolite sodium X or mixtures thereof.

21. The method of claim 16, wherein said divalent cations comprise calcium ions.

22. The method of claim 16, wherein upon completion of step (c), at least about 95% of the exchangeable cations of said zeolite A and at least about 95% of the exchangeable cations of said zeolite X of said composite zeolitic adsorbent are calcium ions.

23. The method of claim 3, wherein said gas is air.

24. The method of claim 23, wherein said zeolite X has a Si/Al atomic ratio less than about 1.1.

25. The method of claim 23, wherein said cyclical adsorption procedure is temperature swing adsorption.

26. The method of claim 25, wherein said adsorbent regeneration step is carried out at a temperature in the range of about 150 to about 280° C.

27. The method of claim 23, further comprising, prior to removing said at least one nitrogen oxide and said at least one low molecular weight hydrocarbon from said gas but subsequently to removing water vapor from said gas, removing carbon dioxide from said gas by contacting said gas with an adsorbent comprising zeolite X.

28. The method of claim 21, wherein said at least one low molecular weight hydrocarbon comprises $CH_4$, $C_2$ hydrocarbons, $C_3$ hydrocarbons, $C_4$ hydrocarbons, $C_5$ hydrocarbons, or mixtures thereof.

29. The method of claim 28, wherein said at least one nitrogen oxide comprises nitrous oxide.

30. Apparatus comprising:

(a) a vessel having a feed air inlet and a purified air outlet;

(b) a water vapor-selective adsorbent positioned within said vessel adjacent said air inlet; and (c) a composite zeolitic adsorbent selective for at least one nitrogen oxide and at least one low molecular weight hydrocarbon positioned within said vessel between said water vapor-selective adsorbent and said purified air outlet, said composite zeolitic adsorbent comprising about 5 to about 95% by weight zeolite A and about 95 to about 5% by weight zeolite X, and wherein at least part of the exchangeable cations of said zeolite A and at least part of the exchangeable cations of said zeolite X are divalent cations.

31. The apparatus of claim 30, wherein said composite zeolitic adsorbent is made by a process which includes the step of contacting an agglomerate comprising at least one of zeolite A or zeolite X and an inert binder comprising silica, clay, alumina or combinations thereof with a reagent which effects the conversion of at least part of said inert binder to the other of zeolite A or zeolite X.

32. The apparatus of claim 31, wherein said composite zeolitic adsorbent is made by a process which includes the step of contacting an agglomerate comprising zeolite X and an inert binder comprising silica, clay, alumina or combinations thereof with a reagent which effects the conversion of at least part of said inert binder to zeolite A.

33. The apparatus of claim 32, wherein at least 95% of the inert binder is converted to zeolite A.

34. The apparatus of claim 32, wherein said inert binder comprises silica and said reagent comprises sodium aluminate, sodium hydroxide, potassium hydroxide or mixtures thereof.

35. The apparatus of claim 34, wherein said inert binder is silica-alumina.

36. The apparatus of claim 32, wherein said inert binder comprises clay and said reagent comprises sodium hydroxide, potassium hydroxide or mixtures thereof.

37. The apparatus of claim 36, wherein said clay comprises kaolin, metakaolin, kaolinite, nacrite, dickite, halloysite or combinations thereof.

38. The apparatus of claim 37, wherein said clay comprises kaolin.

39. The apparatus of claim 32, wherein said inert binder comprises alumina and said reagent comprises sodium silicate and sodium hydroxide, potassium hydroxide or mixtures thereof.

40. The apparatus of claim 32, wherein about 50 to about 100% of the exchangeable cations of said zeolite A and about 50 to about 100% of the exchangeable cations of said zeolite X comprise calcium, magnesium, strontium, barium, zinc, copper, cadmium, cobalt, manganese, iron, nickel or mixtures thereof.

41. The apparatus of claim 40, wherein said exchangeable cations comprise calcium ions.

42. The apparatus of claim 41, wherein at least about 50% of said zeolite X has a Si/Al atomic ratio in the range of about 0.9 to less than about 1.15.

43. The apparatus of claim 42, wherein said composite zeolitic adsorbent comprises about 20 to about 50% by weight zeolite A and about 80 to about 50% by weight zeolite X.

44. The apparatus of claim 41, further comprising a carbon dioxide-selective adsorbent positioned within said vessel between said water vapor-selective adsorbent and said composite zeolitic adsorbent.

45. The apparatus of claim 44, wherein said water vapor-selective adsorbent comprises activated alumina, silica gel, zeolite sodium X or mixtures thereof, and said carbon dioxide-selective adsorbent comprises zeolite X.

46. The apparatus of claims 32, wherein said composite zeolitic adsorbent is prepared by the process comprising the steps:

(a) forming a mixture comprising (1) an agglomerate comprising silica and zeolite X comprising sodium ions or both sodium and potassium ions, said zeolite X having a Si/Al atomic ratio in the range of about 0.9 to less than about 1.25, and (2) an aqueous alkaline aluminate solution comprising sodium hydroxide, potassium hydroxide, or mixtures thereof;

(b) maintaining said mixture at a temperature in the range of about 25 to about 100° C. for a period of time sufficient to convert at least 50% of said silica to zeolite A; and (c) at least partially exchanging the product of step (b) with divalent cations.

47. The apparatus of claim 46, wherein said agglomerate additionally comprises zeolite A.

48. The apparatus of claim 46, wherein upon completion of step (b), at least about 95% of said silica has been converted to zeolite A.

49. The apparatus of claim 46, wherein said divalent cations comprise calcium ions.

50. The apparatus of claim 49, wherein said zeolite X has a Si/Al atomic ratio less than about 1.1.

51. The apparatus of claim 49, wherein upon completion of step (c), at least about 95% of the exchangeable cations of said zeolite A and at least about 95% of the exchangeable cations of said zeolite X of said composite zeolitic adsorbent are calcium ions.

52. The apparatus of claim 46, wherein said process comprises maintaining said mixture at a temperature in the range of about 70 to about 90° C. during at least part of step (b).

\* \* \* \* \*